United States Patent [19]

Amano et al.

[11] 4,194,472

[45] Mar. 25, 1980

[54] EXHAUST GAS RECIRCULATION SYSTEM OF A MULTI-CYLINDER INTERNAL COMBUSTION ENGINE

[75] Inventors: Masuo Amano, Okazaki; Toshio Tanahashi, Toyota, both of Japan

[73] Assignee: Toyota Jidosha Kogyo Kabushiki Kaisha, Toyota, Japan

[21] Appl. No.: 888,733

[22] Filed: Mar. 21, 1978

[30] Foreign Application Priority Data

Dec. 2, 1977 [JP] Japan .................. 52-144674

[51] Int. Cl.² ........................................... F02M 25/06
[52] U.S. Cl. ........................... 123/119 A; 123/59 EC; 123/75 B; 123/75 C
[58] Field of Search ............. 123/119 A, 325 T, 75 B, 123/75 C, 59 EC

[56] References Cited

U.S. PATENT DOCUMENTS

| | | | |
|---|---|---|---|
| 3,702,111 | 11/1972 | Weaving et al. | 123/119 A |
| 3,785,355 | 1/1974 | Toepel | 123/119 A |
| 4,109,625 | 8/1978 | Kawamura et al. | 123/119 A |
| 4,116,189 | 9/1978 | Asaga | 123/119 A |
| 4,134,381 | 1/1979 | Little | 123/119 A |

*Primary Examiner*—Wendell E. Burns
*Attorney, Agent, or Firm*—Kenyon & Kenyon

[57] ABSTRACT

Disclosed is a multi-cylinder engine having auxiliary valves in addition to intake and exhaust valves. A common exhaust gas passage is formed in the cylinder head and is connected to each of cylinders via the corresponding branches. Each of the auxiliary valves is arranged in a respective branch and opens at a time of the latter half of the exhaust stroke and at the end of the intake stroke, so that the auxiliary valve of one cylinder opens in synchronization with the opening operation of the auxiliary valve of another cylinder. The valve lift or the opening duration of the auxiliary valves of said one cylinder and another cylinder which are arranged adjacent to each other is set so as to be less than that of the auxiliary valves of said one cylinder and another cylinder which are not arranged adjacent to each another.

6 Claims, 16 Drawing Figures

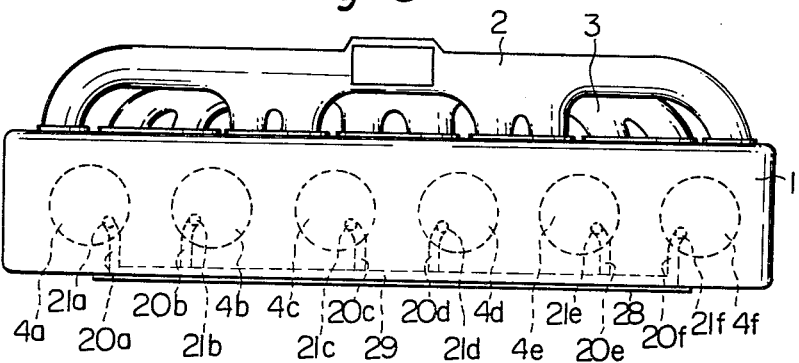
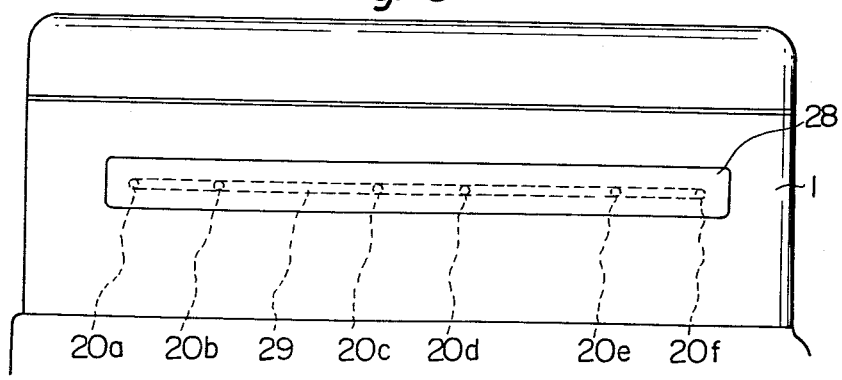
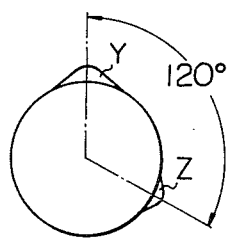

EXHAUST GAS RECIRCULATION SYSTEM OF A MULTI-CYLINDER INTERNAL COMBUSTION ENGINE

DESCRIPTION OF THE INVENTION

The present invention relates to an exhaust gas recirculation system of a multi-cylinder internal combustion engine.

As a method of effectively reducing the amount of harmful $NO_x$ components in exhaust gas, there has been known a method of recirculating the exhaust gas into the intake system of an engine. However, if the amount of the recirculated exhaust gas (hereinafter referred to as an EGR gas) is increased in a conventional engine, since the flame speed becomes low, the burning velocity is reduced. This results in a problem in that a stable combustion cannot be obtained. In addition, an ease of ignition cannot be obtained and, sometimes, a misfire occurs.

As a method for increasing the burning velocity in the case wherein the exhaust gas recirculating operation is carried out, there has been known a method of increasing the burning velocity by constructing the combustion chamber, the intake valve, the piston and the intake port so that a swirl motion or a squish flow is created in the combustion chamber. However, an engine adopting such a method has a drawback in that it needs to be provided with both of an EGR system and a swirling motion or squish flow generating mechanism.

In order to eliminate the above mentioned drawback, there has been proposed a multi-cylinder engine in which the EGR gas is directly spouted into the combustion chamber so as to cause turbulence in the combustion chamber. This multi-cylinder engine has such a construction that a plurality of EGR gas feed branches, each being connected to a respective cylinder, is connected to a single common EGR gas feed passage, and an auxiliary valve is disposed in each of the EGR gas feed branches. In operation, when the auxiliary valve is opened, the EGR gas is fed into the cylinder from an adjacent cylinder or a cylinder which is not arranged adjacent to the cylinder into which the EGR gas is fed. However, in this multi-cylinder engine, since the length of the EGR gas flow passage in the case wherein the EGR gas is fed into the cylinder from the adjacent cylinder is shorter as compared with the case wherein the EGR gas is fed into the cylinder from a cylinder which is not arranged adjacent to the cylinder into which the EGR gas is fed, the EGR gas flowing in the EGR gas flow passage is subjected to different resistances in the above-mentioned two cases. As a result of this, the amount of the EGR gas and the injection timing of the EGR gas are varied at every clinder, thereby causing the fluctuation of torque. In addition, in a cylinder into which the EGR gas is fed in an amount which is less than that of the EGR gas fed into the remaining cylinders, a satisfactory effectiveness of reducing the amount of harmful $NO_x$ components cannot be obtained. Furthermore, in a cylinder into which the EGR gas is fed in an amount which is larger than that of the EGR gas fed into the remaining cylinders, there is a danger that a misfire will occur.

An object of the present invention is to provide an EGR system of a multi-cylinder engine, in which a satisfactory effectiveness of reducing the amount of harmful $NO_x$ components can be obtained without occurrences of misfires and fluctuations of torque by making the amount of the EGR gas, the injection timing of the EGR gas and the injecting velocity of the EGR gas uniform.

According to the present invention, there is provided a multi-cylinder engine having a plurality of cylinders each having an intake valve and an exhaust valve, said engine comprising: a common exhaust gas passage; a plurality of exhaust gas branches each interconnecting its respective cylinder with said common exhaust passage; a plurality of auxiliary valves each of which is located in its respective exhaust gas branch and opens at a time of the latter half of the exhaust stroke and at the end of the intake stroke of the corresponding cylinder, so that the auxiliary valve of one cylinder opens in the exhaust stroke thereof in synchronization with the opening operation of the auxiliary valve of another cylinder, which opens in the intake stroke thereof, for spouting out the exhaust gas into said other cylinder from said one cylinder; and means for controlling the valve parameters of said auxiliary valves to uniformly feed the exhaust gas into all of the cylinders.

The present invention may be more fully understood from the description of preferred embodiments of the invention set forth below, together with the accompanying drawings.

BRIEF DESCRIPTION OF THE DRAWINGS

In the drawings:

FIG. 8 is a plan view of another embodiment of an engine according to the present invention;

FIG. 9 is a side view of the engine illustrated in FIG. 8;

FIG. 10 is a view illustrating a profile of a cam;

DESCRIPTION OF PREFERRED EMBODIMENTS

Figure 1:
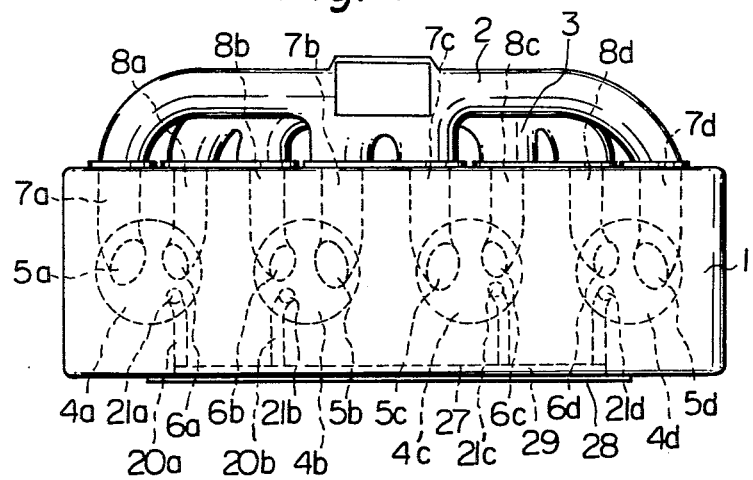
FIG. 1 is a plan view of an embodiment of an engine according to the present invention.

FIG. 1 is a plan view of a four-cylinder engine according to the present invention. Referring to FIG. 1, 1 designates an engine body, 2 an intake manifold, 3 an exhaust manifold, and 4a, 4b, 4c and 4d designate the No. 1 cylinder, No. 2 cylinder, No. 3 cylinder and No. 4 cylinder, respectively. The cylinders 4a, 4b, 4c and 4d have intake valves 5a, 5b, 5c and 5d and exhaust valves 6a, 6b, 6c and 6d, respectively. The cylinders 4a, 4b, 4c and 4d are connected to the intake manifold 2 via the intake valves 5a, 5b, 5c and 5d and intake ports 7a, 7b, 7c and 7d, respectively, on one hand, and to the exhaust manifold 3 via the exhaust valves 6a, 6b, 6c and 6d and exhaust ports 8a, 8b, 8c and 8d, respectively, on the other hand.

Figure 4:
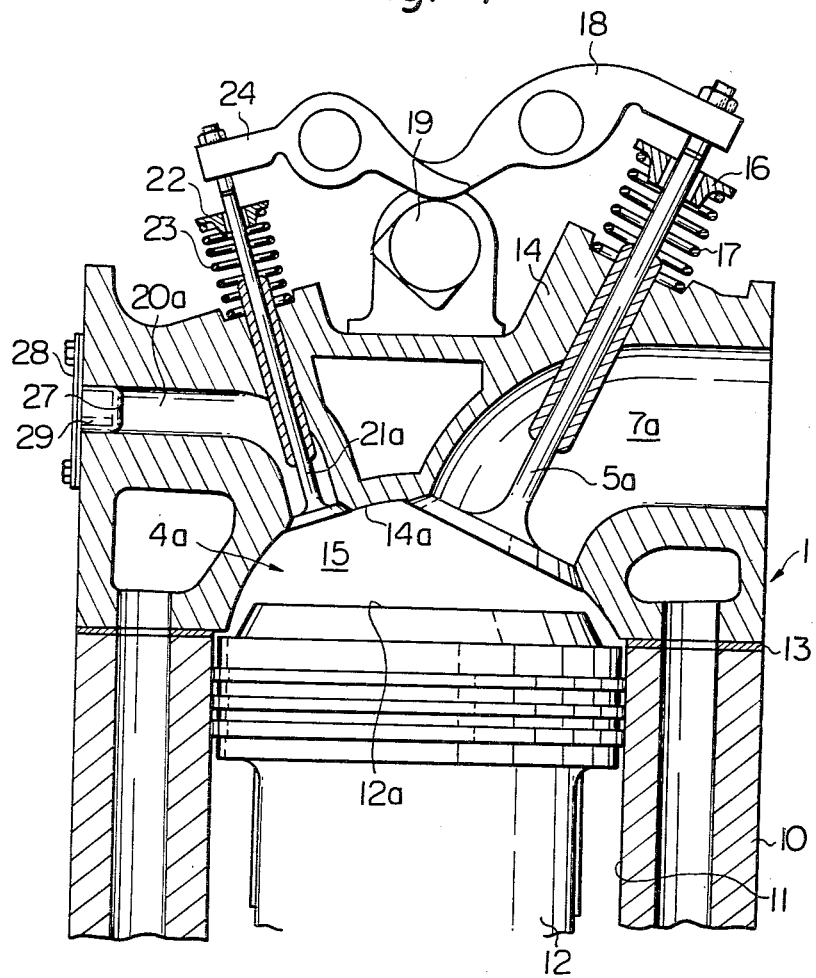
FIG. 4 is a cross-sectional side view of the engine illustrated in FIG. 1.

FIG. 4 is a cross-sectional side view of the No. 1 cylinder 4a illustrated in FIG. 1. The remaining cylinders 4b, 4c and 4d have a construction similar to the cylinder 4a and, accordingly, the depiction of these remaining cylinders is omitted. Referring to FIG. 4, the engine body 1 comprises a cylinder block 10, a piston 12 reciprocally movable in a cylinder bore 11 formed in the cylinder block 10, and a cylinder head 14 fixed onto the cylinder block 10 via a gasket 13. As is illustrated in FIG. 4, a combustion chamber 15 of the No. 1 cylinder 4a is formed between the top face 12a of the piston 12 and the inner wall 14a of the cylinder head 14. A valve retainer 16 is fixed onto the upper end of the valve stem of the intake valve 5a, and a valve spring 17 is interposed between the valve retainer 16 and the cylinder head 14. The intake valve 5a is actuated by a rocker arm 18 which is actuated by a cam shaft 19 connected to the crank shaft (not shown) of an engine and rotating at a speed half of the rotation speed of the crank shaft.

Figure 2:
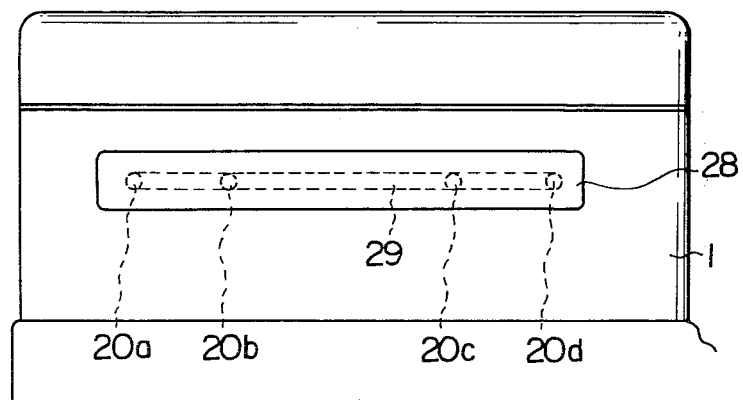
FIG. 2 is a side view of the engine illustrated in FIG. 1.
Figure 5:
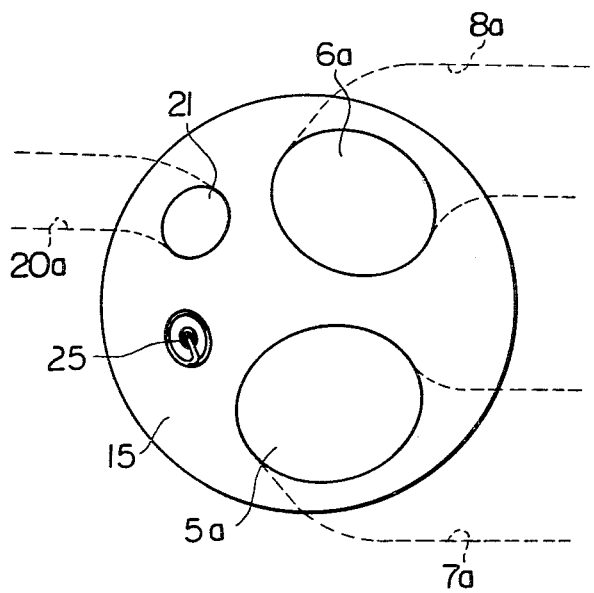
FIG. 5 is a bottom view of the cylinder head illustrated in FIG. 4.

An EGR gas feed branch 20a is formed in the cylinder head, and an auxiliary valve 21a is slidably mounted on the cylinder head 14 for controlling the opening operation of the open end of the EGR gas feed branch 20a, which opens into the combustion chamber 15. A valve retainer 22 is fixed onto the upper end of the valve stem of the auxiliary valve 21a, and a valve spring 23 is interposed between the valve retainer 22 and the cylinder head 14. This auxiliary valve 21a is driven by the cam shaft 19 via a rocker arm 24. In addition, as is illustrated in FIG. 5, the electrode 25 of a spark plug is arranged in the combustion chamber 15. As is illustrated in FIGS. 1 and 4, a groove 27 extending in the longitudinal direction of the cylinder head 14 is formed on the outer wall of the cylinder head 14. This groove 27 is covered by a cover 28 fixed onto the outer wall of the cylinder head 14 so that an EGR gas feed common passage 29 is formed in the groove 27. As is illustrated in FIG. 4, the EGR gas feed branch 20a is connected to the EGR gas feed common passage 29 and, in addition, as is illustrated in FIG. 1, the EGR gas feed branches 20b, 20c, 20d of the remaining cylinders 4b, 4c, 4d are also connected to the EGR gas feed common passage 29. In FIG. 2, auxiliary valves of the cylinders 4b, 4c and 4d are designated by reference numerals 21b, 21c and 21d, respectively.

Figure 6:
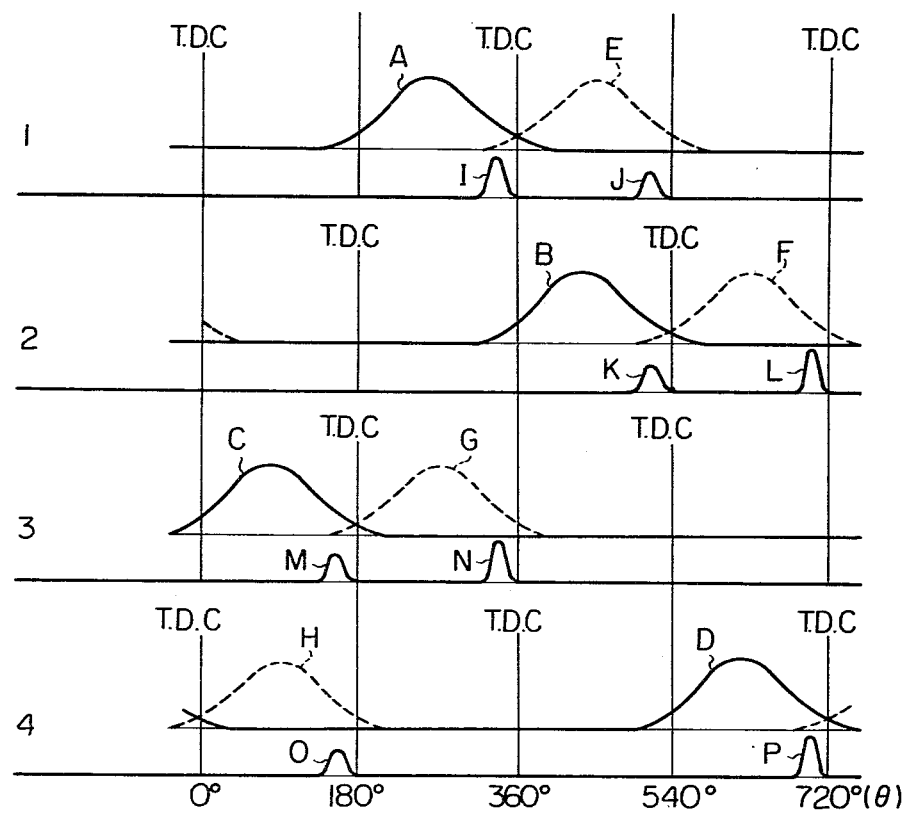
FIG. 6 is a diagram illustrating the opening timing of the intake valve, the exhaust valve and the auxiliary valve.
Figure 7:
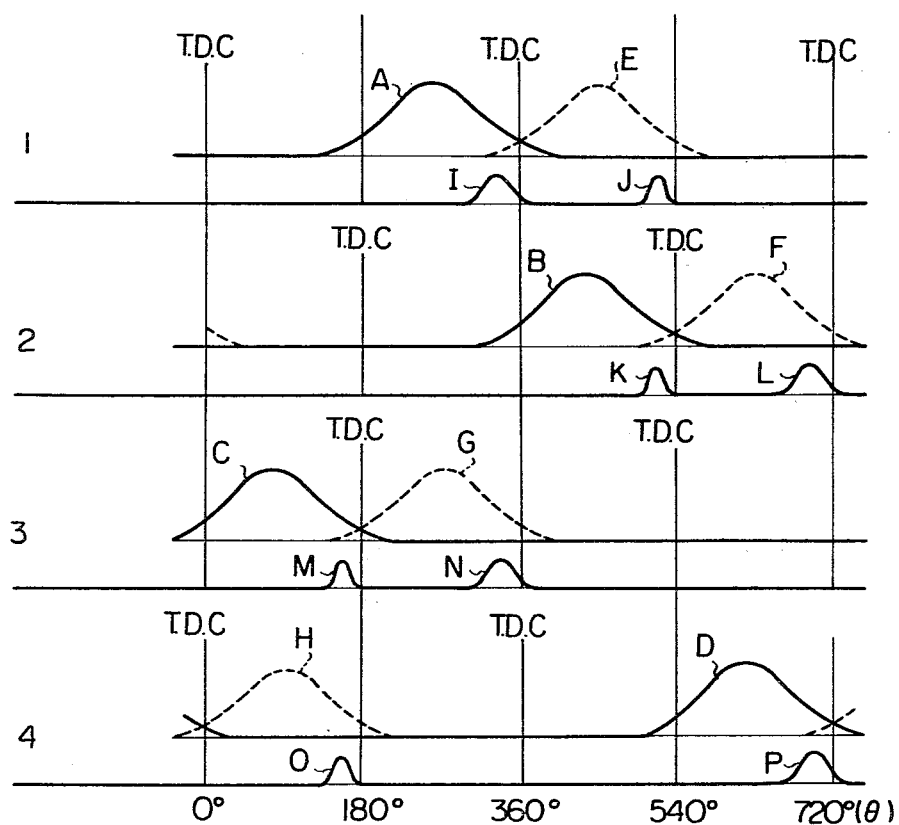
FIG. 7 is a diagram illustrating the opening timing of the intake valve, the exhaust valve and the auxiliary valve.

FIGS. 6 and 7 illustrate the opening timing of the intake valve, the exhaust valve and the auxiliary valve. In FIGS. 6 and 7, the ordinate indicates valve lift, and the abscissa indicates crank angle. In addition, in FIGS. 6 and 7, the curved lines A, B, C and D indicate the opening timing of the exhaust valves of the cylinders 4a, 4b, 4c and 4d, respectively; the curved lines E, F, G and H indicate the opening timing of the intake valves of the cylinders 4a, 4b, 4c and 4d, respectively; the curved lines I and J indicate the opening timing of the auxiliary valve 21a of the No. 1 cylinder 4a; the curved lines K and L indicate the opening timing of the auxiliary valve 21b of the No. 2 cylinder 4b; the curved lines M and N indicate the opening timing of the auxiliary valve 21c of the No. 3 cylinder 4c, and; the curved lines O and P indicate the opening timing of the auxiliary valve 21d of the No. 4 cylinder 4d. FIGS. 6 and 7 illustrate the case wherein an engine has the firing order of 1-2-4-3.

As will be understood from FIGS. 6 and 7, the auxiliary valve of each of the cylinders 4a, 4b, 4c and 4d opens twice per every cycle of an engine. In addition, for example, referring to the No. 1 cylinder illustrated in FIG. 6, it is understood that, as is illustrated by the curved line I, the auxiliary valve opens at the end of the exhaust stroke immediately before the exhaust valve closes and, then, as is illustrated by the curved line J, the auxiliary valve opens again at the end of the intake stroke immediately before the intake valve closes. The timing of the auxiliary valve is the same in the remaining cylinders. Referring to the No. 1 cylinder and No. 2 cylinder illustrated in FIG. 6, it will be understood that, when the No. 2 cylinder is in the exhaust stroke, the No. 1 cylinder is in the intake stroke and, in addition, the opening timing J of the auxiliary valve of the No. 1 cylinder is in synchronization with the opening timing K of the auxiliary valve of the No. 2 cylinder. The pressure in the cylinder is relatively high at the end of the exhaust stroke, and a vacuum is produced in the cylinder at the end of the intake stroke. Consequently, when the auxiliary valves of the different separate cylinders open in synchronization with each other, as shown by the curved lines J and K, the exhaust gas in the No. 2 cylinder 4b is spouted into the No. 1 cylinder 4a at a high speed via auxiliary valve 21b, the EGR gas feed branch 20b, the EGR gas feed common passage 29, the EGR gas feed branch 20a and the auxiliary valve 21a, due to the pressure difference between the pressure in the No. 2 cylinder and the vacuum in the No. 1 cylinder. As a result, in FIG. 4, the exhaust gas spouted from the EGR gas feed branch 20a causes tubulence in an air-fuel mixture which is introduced into the combustion chamber 15 via the intake valve 5a. As a result of this, the burning velocity is increased while ensuring a satisfactory effectiveness of reducing the amount of harmful $NO_x$ component in the exhaust gas and, thus, a stable combustion can be obtained.

Referring to the No. 2 cylinder and the No. 4 cylinder illustrated in FIG. 6, the opening timing P of the auxiliary valve of the No. 4 cylinder at the time of the exhaust stroke is in synchronization with the opening timing L of the auxiliary valve of the No. 2 cylinder at the time of the intake stroke. Consequently, the exhaust gas in the No. 4 cylinder is fed into the No. 2 cylinder. On the other hand, the opening timing I of the auxiliary valve of the No. 1 cylinder is in synchronization with the opening timing N of the auxiliary valve of the No. 3 cylinder, and the opening timing M of the auxiliary valve of the No. 3 cylinder is in synchronization with the opening timing O of the auxiliary valve of the No. 4 cylinder. Consequently, the exhaust gas in the No. 1 cylinder is fed into the No. 3 cylinder, and the exhaust gas in the No. 3 cylinder is fed into the No. 4 cylinder. However, while the length of the flow passage of the exhaust gas which flows into the cylinder from the adjacent cylinder, for example, which flows into the No. 1 cylinder from the No. 2 cylinder, is relatively short, the length of the flow passage of the exhaust gas which flows into the cylinder from a cylinder which is not arranged adjacent to the cylinder into which the exhaust gas is fed, as in the case wherein the exhaust gas flows into the No. 2 cylinder from No. 4 cylinder, is relatively long. As a result of this, when the exhaust gas flows into the No. 2 cylinder from the No. 4 cylinder, the exhaust gas is subjected to a greater resistance as compared with the case wherein the exhaust gas flows into the No. 1 cylinder from the No. 2 cylinder. Consequently, if valve parameters, such as the opening duration and the valve lift, of the auxiliary valves of all of the cylinders are set so as to be uniform, the amount and flow velocity of the exhaust gas fed into the No. 2 cylinder become considerably less than the amount and flow velocity of the exhaust gas fed into the No. 1 cylinder. Therefore, in the case wherein the above-mentioned valve parameters of all of the auxiliary valves are so set that the amount of the exhaust gas fed into the No. 2 cylinder becomes optimum, the amount of the exhaust gas fed into the No. 1 cylinder becomes excessive, thereby causing a problem in that a misfire occurs. On the other hand, in the case wherein the valve parameters of all of the auxiliary valves are such that the amount of the exhaust gas fed into the No. 1 cylinder becomes optimum, the amount of the exhaust gas fed into the No. 2 cylinder becomes small, thereby causing a problem in that a satisfactory effectiveness of reducing the amount of harmful $NO_x$ components in the exhaust gas can not be obtained.

In order to avoid such problems, according to the present invention, as is illustrated in FIG. 6, while the opening duration of all of the auxiliary valves is set at the same length, the valve lift of pairs of the auxiliary valves of the cylinders arranged adjacent to each other, which valves open in synchronization with each other, is set so as to be smaller than that of pairs of the auxiliary valves of the cylinders arranged not adjacent to each other, which valves open in synchronization with each other. That is, the valve lift of pairs of the auxiliary valves illustrated by the curved lines J, K and M, O is set so as to be smaller than that of pairs of the auxiliary valves illustrated by the curved lines I, N and L, P. Consequently, in the case wherein the exhaust gas is fed into the No. 2 cylinder from the No. 4 cylinder, even if the length of the flow passage of the exhaust gas is relatively long, the valve lift of the auxiliary valves is large, as illustrated by the curved lines L and P. Consequently, the throttling operation of the exhaust gas flow, which is caused by the auxiliary valves, is weak and, as a result, it is possible to feed the exhaust gas into the No. 2 cylinder in an amount which is equal to that in the case wherein the exhaust gas is fed into the cylinder from the adjacent cylinder. Therefore, in all of the cylinders, the burning velocity is increased, while ensuring a satisfactory effectiveness of reducing the amount of harmful $NO_x$ components in the exhaust gas.

FIG. 7 illustrates the case wherein valve lift of all of the auxiliary valves is set at the same lift and, in addition, the opening duration of pairs of the auxiliary valves of the cylinders arranged adjacent to each other, which valves open in synchronization with each other, is set so as to be shorter than that of pairs of the auxiliary valves of the cylinders arranged not adjacent to each other, which valves open in synchronization with each other. In this case, in the same manner as described with reference to FIG. 6, the amount of the exhaust gas fed into each of the cylinders becomes uniform.

Figure 3:
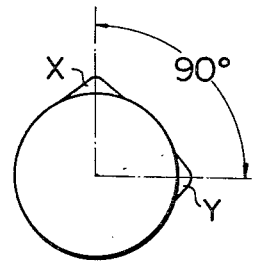
FIG. 3 is a view illustrating a profile of a cam.

FIG. 3 illustrates a cam used for actuating the auxiliary valves. This cam has a pair of projections X and Y which are spaced apart from each other by an angle of 90 degrees. From FIGS. 6 and 7, it will be understood that the profile of the projection X is different from that of the projection Y.

Figure 11:
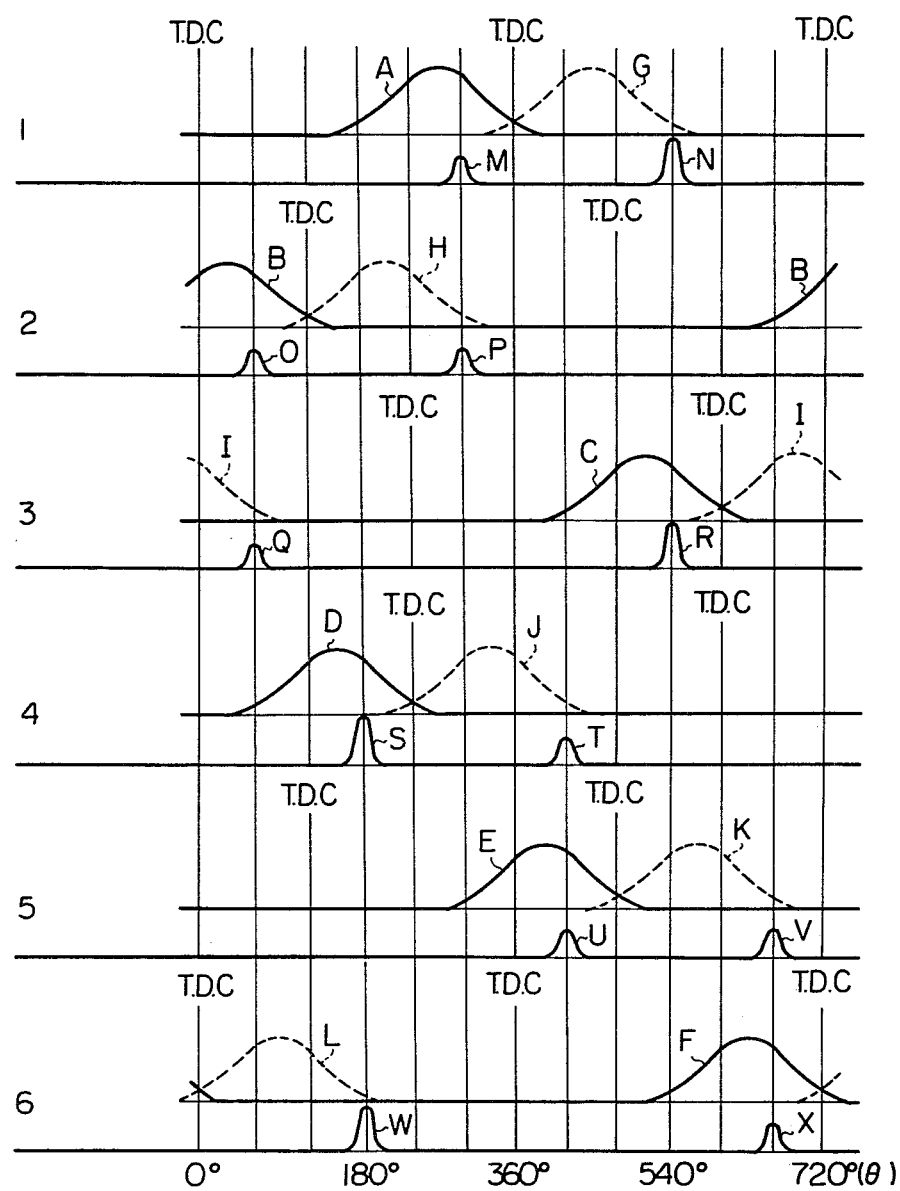
FIG. 11 is a diagram illustrating the opening timing of the intake valve, the exhaust valve and the auxiliary valve.
Figure 12:
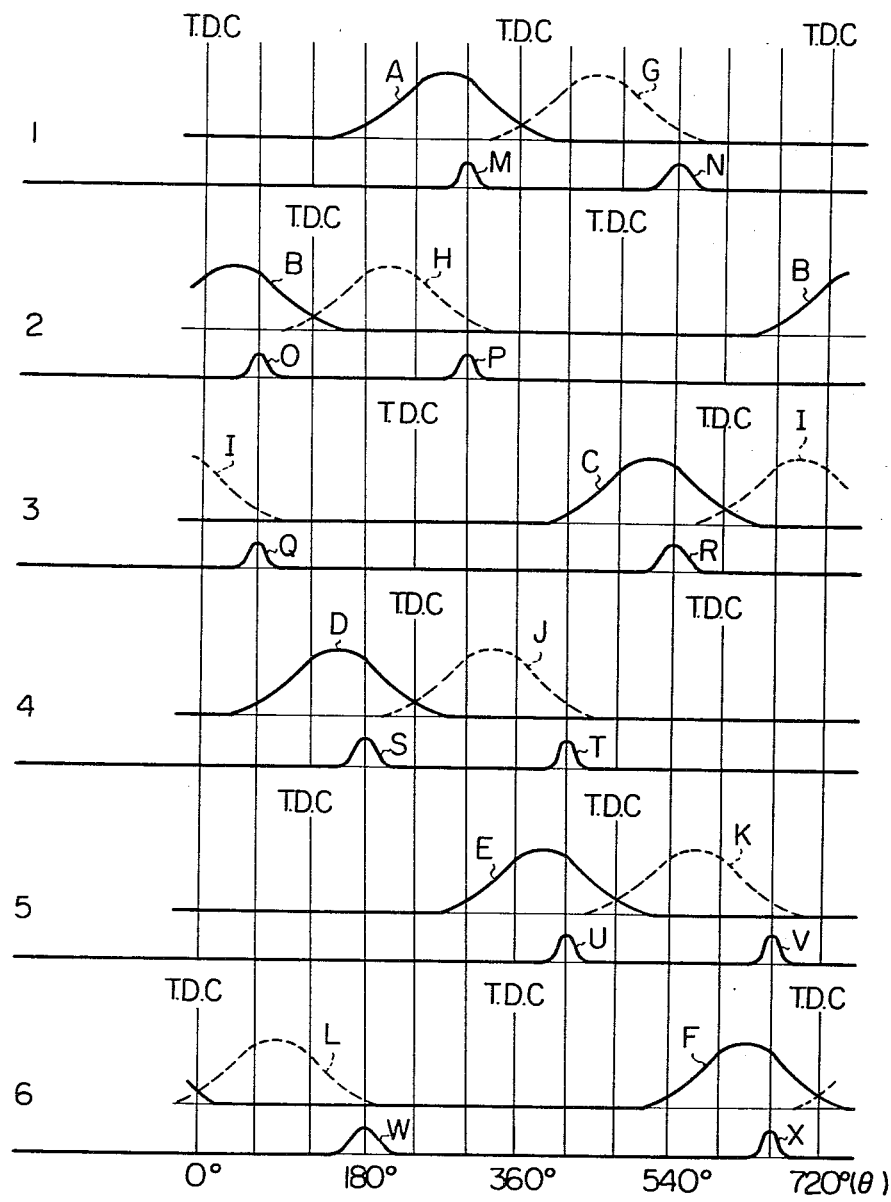
FIG. 12 is a diagram illustrating the opening timing of the intake valve, the exhaust valve and the auxiliary valve.

FIGS. 8 and 9 illustrate the case wherein the present invention is applied to a six-cylinder engine. In FIGS. 8 and 9, similar components are indicated with the same reference numerals as used in FIGS. 1 and 2. As illustrated in FIG. 8, the engine body 1 comprises No. 1 through No. 6 cylinders 4a, 4b, 4c, 4d, 4e and 4f, which are connected to the EGR gas feed common passage 29 via the auxiliary valves 21a, 21b, 21c, 21d, 21e and 21f, and the EGR gas feed branches 20a, 20b, 20c, 20d, 20e and 20f, respectively. FIGS. 11 and 12 illustrate the opening timing of the intake valve, the exhaust valve and the auxiliary valve. In FIGS. 11 and 12, the curved lines A, B, C, D, E and F indicate the opening timing of the exhaust valve; the curved lines G, H, I, J, K and L indicate the opening timing of the intake valve, and; the curved lines M, N, O, P, Q, R, S, T, U, V, W and X indicate the opening timing of the auxiliary valve. FIGS. 11 and 12 illustrate the case wherein an engine has the firing of 1-5-3-6-2-4. Referring to the No. 1 cylinder illustrated in FIG. 11, the auxiliary valve opens at a time of the latter half of the exhaust stroke, as indicated by the curved line M, and then opens at the end of the intake stroke, as indicated by the curved line N. Referring to the No. 1 and the No. 2 cylinders illustrated in FIG. 11, as is indicated by the curved lines M and P, the opening timing of the auxiliary valve of the No. 1 cylinder is in synchronization with the opening timing of the auxiliary valve of the No. 2 cylinder and, when the auxiliary valves of the No. 1 and the No. 2 cylinders open in synchronization with each other, the exhaust gas flows into the No. 2 cylinder from the No. 1 cylinder. In a six-cylinder engine, since the auxiliary valve opens at a time of the latter half of the exhaust stroke wherein the pressure in the cylinder is high, the pressure difference between the pressure in the No. 1 cylinder and the vacuum in the No. 2 cylinder is greater as compared with the case wherein the auxiliary valve opens at the end of the exhaust stroke, as in a four-cylinder engine. As a result of this, the injecting velocity of the exhaust gas is increased and, thus, a strong turbulence can be created in the cylinder.

As will be understood from FIG. 11, the exhaust gas is fed from the No. 3 cylinder into the No. 1 cylinder; from No. 6 cylinder into the No. 5 cylinder; from No. 2 cylinder into the No. 3 cylinder; from the No. 4 cylinder into the No. 6 cylinder; from the No. 1 cylinder into the No. 2 cylinder; and then, from the No. 5 cylinder into the No. 4 cylinder. In this embodiment, in the same manner as described with reference to FIG. 1, while the opening duration of all of the auxiliary valves is set at the same length, the valve lift of pairs of the auxiliary valves of the cylinders arranged adjacent to each other, which valves open in synchoronization with each other, is set so as to be smaller than that of pairs of the auxiliary valves of the cylinders arranged not adjacent to each other, which valves open in synchronization with each other. That is, the valve lift of the pairs of the auxiliary valves indicated by the curved lines M, P; O, Q; T, U; and V, X is set so as to be smaller than that of the pairs of the auxiliary valves indicated by the curved lines N, R and S, W.

FIG. 12 illustrates the case wherein the valve lift of all of the auxiliary valves is set at the same lift and, in addition, the opening duration of pairs of the auxiliary valves of the cylinders arranged adjacent to each other, which valves open in synchronization with each other, is set so as to be shorter than that of pairs of the auxiliary valves of the cylinders arranged not adjacent to each other, which valves open in synchronization with each other. FIG. 10 illustrates a cam used for actuating the auxiliary intake valves in a six-cylinder engine. This cam has a pair of projections Y and Z which are spaced apart from each other by an angle of 120 degrees.

Figure 13:
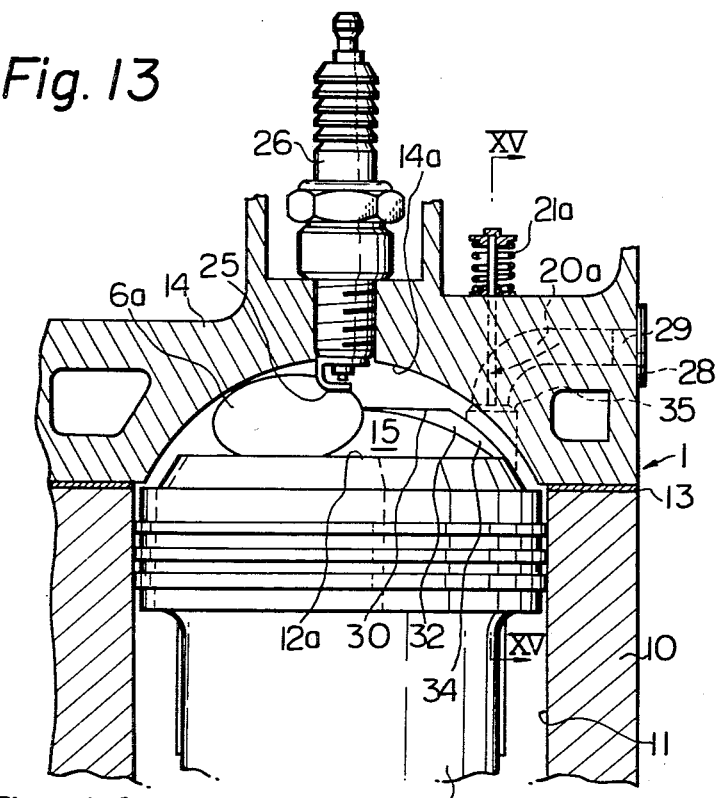
FIG. 13 is a cross-sectional side view of a further embodiment according to the present invention.
Figure 14:
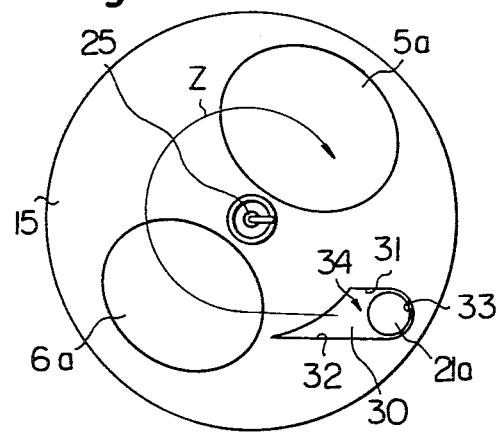
FIG. 14 is a bottom view of the cylinder head illustrated in FIG. 13.
Figure 15:
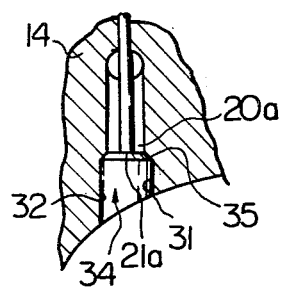
FIG. 15 is a cross-sectional view taken along the line XV—XV in FIG. 13.

FIGS. 13 through 15 illustrate another embodiment according to the present invention. In FIGS. 13 through 15, similar components are indicated with the same reference numerals used in FIG. 4. Referring to FIG. 13, a groove 34, defined by a horizontal wall 30, a pair of vertical walls 31, 32 and a semi-cylindrical wall 33, is formed on the inner wall 14a of the cylinder head 14, and the valve head of the auxiliary valve 21a is exposed to the inside of the groove 34. The semi-cylindrical wall 33 is arranged at a position near the periphery of the valve head of the auxiliary valve 21a, so that, when the auxiliary valve 21a opens, the exhaust gas is spouted into the combustion chamber 15 from the opening which is formed between the valve seat 35 and the valve head of the auxiliary valve 21a at the left side in FIG. 14. In addition, as shown in FIG. 14, the groove 34 is formed so as to extend in the circumferential direction of the combustion chamber 15 and, accordingly, the exhaust gas spouted from the EGR gas feed branch 20a into the combustion chamber 15 via the auxiliary valve 21a causes a strong swirling motion in the combustion chamber 15, as shown by the arrow Z. This swirling motion causes an increase in the burning velocity and, as a result, a stable combustion can be obtained while ensuring a satisfactory effectiveness of reducing the amount of harmful $NO_x$ components in the exhaust gas. In the embodiment illustrated in FIG. 13, it is prefereble to locate the electrode 25 of the spark plug 26 at the apex of the combustion chamber 15.

Figure 16:
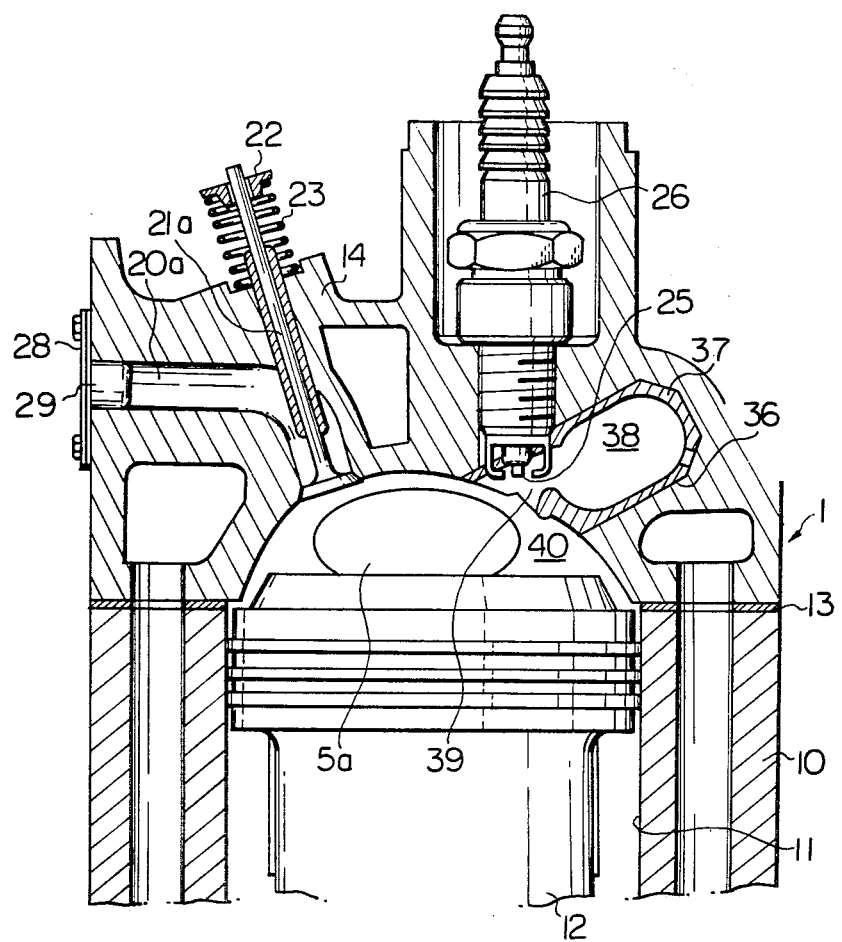
FIG. 16 is a cross-sectional side view of a still further embodiment according to the present invention.

FIG. 16 illustrates a further embodiment according to the present invention. In FIG. 16, similar components are indicated with the same reference numerals as used in FIG. 4. Referring to FIG. 16, a recess 36 is formed in the cylinder head 14, and an auxiliary chamber component 37 is press-fitted into the recess 36. An auxiliary combustion chamber 38 and a connecting passage 39 are formed in the auxiliary chamber component 37, and the electrode 25 of the spark plug 26 is located in the connecting passage 39. In this embodiment, at the time of the intake stroke, a lean air-fuel mixture is introduced into a main combustion chamber 40 via the intake valve 5a. Then, the exhaust gas spouted from the EGR gas feed branch 20a into the main combustion chamber 40 via the auxiliary valve 21a causes a strong turbulence in the lean air-fuel mixture in the main combustion chamber. After this, at the time of the compression stroke, the combustible mixture in the main combustion chamber 40 is forced into the auxiliary combustion chamber 38 via the connecting passage 39. When the combustible mixture in the auxiliary combustion chamber 38 is ignited by the spark plug 26, a burning jet is injected from the connecting passage 39 into the main combustion chamber 40. This burning jet further causes a turbulence in the combustible mixture in the main combustion chamber 40, and the combustible mixture is ignited by the burning jet. In this embodiment, since both of the burning jet injected from the connecting passage 39 and the exhaust gas injected from the EGR gas feed branch 20a cause a strong turbulence in the combustible mixture in the main combustion chamber 40, the burning velocity is considerable increased.

According to the present invention, since the exhaust gas is uniformly fed into the cylinders and, in addition, this exhaust gas causes a strong turbulence in the combustion chamber, the burning velocity is increased while ensuring an effectiveness of reducing the amount of harmful $NO_x$ components in the exhaust gas. As a result of this, a stable combustion can be obtained without the occurrence of a misfires and fluctuations of the torque.

While the invention has been described by referring to specific embodiments chosen for purposes of illustration, it should be apparent that numerous modifications could be made thereto by those skilled in the art without departing from the spirit and scope of the invention.

What is claimed is:

1. A multi-cylinder engine having a plurality of cylinders, each having an intake valve and an exhaust valve, said engine comprising:

a common exhaust gas passage;

a plurality of exhaust gas branches, each interconnecting its respective cylinder with said common exhaust passage;

a plurality of auxiliary valves, each of which is located in its respective exhaust gas branch and opens in the latter half of the exhaust stroke and at the end of the intake stroke of the corresponding cylinder, so that the auxiliary valve of one cylinder opens in the exhaust stroke thereof in synchronization with the opening operation of the auxiliary valve of another cylinder, which opens in the intake stroke thereof, for spouting out the exhaust gas into said other cylinder from said one cylinder; and means for controlling a valve parameter of said auxiliary valves to feed the exhaust gas uniformly into all of the cylinders, said auxiliary valves having a first opening relationship in which a pair of said auxiliary valves of the cylinders arranged adjacent to each other open in synchronization with each other and a second opening relationship in which a pair of said auxiliary valves of the cylinders arranged not adjacent to each other open in synchronization with each other, said controlling means causing the difference in said valve parameter between the auxiliary valves having said first opening relationship and the auxiliary valves having said second opening relationship, and wherein said valve parameter is the valve lift, the valve lift of the auxiliary valves which have said first opening relationship being smaller than that of the auxiliary valves which have said second opening relationship.

2. A multi-cylinder engine having a plurality of cylinders, each having an intake valve and an exhaust valve, said engine comprising:

a common exhaust gas passage;

a plurality of exhaust gas branches, each interconnecting its respective cylinder with said common exhaust passage;

a plurality of auxiliary valves, each of which is located in its respective exhaust gas branch and opens in the latter half of the exhaust stroke and at the end of the intake stroke of the corresponding cylinder, so that the auxiliary valve of one cylinder opens in the exhaust stroke thereof in synchronization with the opening operation of the auxiliary valve of another cylinder, which opens in the intake stroke thereof, for spouting out the exhaust gas into said other cylinder from said one cylinder; and means for controlling a valve parameter of said auxiliary valves to feed the exhaust gas uniformly into all of the cylinders, said auxiliary valves having a first opening relationship in which a pair of said auxiliary valves of the cylinders arranged adjacent to each other open in synchronization with each other and a second opening relationship in which a pair of said auxiliary valves of the cylinders arranged not adjacent to each other open in synchronization with each other, said controlling means causing the difference in said valve parameter between the auxiliary valves having said first opening relationship and the auxiliary valves having said second opening relationship, and wherein said valve parameter is the opening duration of the auxiliary valve, the opening duration of the auxiliary valves which have said first opening relationship being shorter than that of the auxiliary valve which have said second opening relationship.

3. A multi-cylinder engine having a plurality of cylinders, each having an intake valve and an exhaust valve, said engine comprising:

a common exhaust gas passage;

a plurality of exhaust gas branches, each interconnecting its respective cylinder with said common exhaust passage, a plurality of auxiliary valves, each of which is located in its respective exhaust gas branch and opens in the latter half of the exhaust stroke and at the end of the intake stroke of the corresponding cylinder, so that the auxiliary valve of one cylinder opens in the exhaust stroke thereof in synchronization with the opening operation of the auxiliary valve of another cylinder, which opens in the intake stroke thereof, for spouting out the exhaust gas into said other cylinder from said one cylinder; and means for controlling a valve parameter of said auxiliary valves to uniformly feed the exhaust gas into all of the cylinders, wherein said exhaust gas branch has an open end which is directed in the circumferential direction of a combustion chamber of the engine for causing a swirl motion in said combustion chamber by the exhaust gas spouted from said exhaust gas branch.

4. A multi-cylinder engine as claimed in claim 3, wherein said engine comprises a spark plug located at the apex of said combustion chamber.

5. A multi-cylinder engine having a plurality of cylinders, each having an intake valve and an exhaust valve, said engine comprising:

a common exhaust gas passage;

a plurality of exhaust gas branches, each interconnecting its respective cylinder with said common exhaust passage;

a plurality of auxiliary valves, each of which is located in its respective exhaust gas branch and opens in the latter half of the exhaust stroke and at the end of the intake stroke of the corresponding cylinder, so that the auxiliary valve of one cylinder opens in the exhaust stroke thereof in synchronization with the opening operation of the auxiliary valve of another cylinder, which opens in the intake stroke thereof, for spouting out the exhaust gas into said said cylinder from said one cylinder; and means for controlling a valve parameter of said auxiliary valves to uniformly feed the exhaust gas into all of the cylinder, wherein said engine comprises a main combustion chamber and an auxiliary combustion chamber which are interconnected to each other via a connecting passage, said exhaust gas branch being connected to said main combustion chamber.

6. A multi-cylinder engine as claimed in claim 5, wherein said engine comprises a spark plug located in said connecting passage.

* * * * *

UNITED STATES PATENT AND TRADEMARK OFFICE
CERTIFICATE OF CORRECTION

PATENT NO. : 4,194,472

DATED : March 25, 1980

INVENTOR(S) : Masuo Amano et al.

It is certified that error appears in the above—identified patent and that said Letters Patent is hereby corrected as shown below:

Column 6, line 22, after "firing" should read -- order --.

Column 8, line 10, after "occurrence of" delete -- a --.

Column 9, line 21, "valve" should read -- valves --.

Column 9, line 29, " , " should read -- ; --.

Column 10, line 28, "said" first occurrence should read -- other --.

Column 10, line 31, "cylinder" should read -- cylinders --.

Signed and Sealed this

Fourteenth Day of July 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,194,472
DATED : March 25, 1980
INVENTOR(S) : Masuo Amano, et al

It is certified that error appears in the above—identified patent and that said Letters Patent is hereby corrected as shown below:

Col. 1, line 54, correct spelling of "cylinder".

Col. 4, line 39, correct spelling of "turbulence".

Col. 6, line 56, correct spelling of "synchronization".

Col. 7, lines 35-36, correct spelling of "preferable".

Col. 8, line 2, change "considerable" to --considerably--.

Signed and Sealed this

Eighteenth Day of August 1981

[SEAL]

Attest:

GERALD J. MOSSINGHOFF

Attesting Officer     Commissioner of Patents and Trademarks